United States Patent
Maxey

(10) Patent No.: US 11,142,626 B2
(45) Date of Patent: *Oct. 12, 2021

(54) RECOVERY OF REINFORCING FIBERS FROM FIBER-REINFORCED COMPOSITES

(71) Applicant: Vartega Inc., Golden, CO (US)

(72) Inventor: Andrew T. Maxey, Arvada, CO (US)

(73) Assignee: Vartega Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,189

(22) Filed: Oct. 22, 2019

(65) Prior Publication Data

US 2021/0017352 A1    Jan. 21, 2021

Related U.S. Application Data

(62) Division of application No. 16/088,757, filed as application No. PCT/US2016/024956 on Mar. 30, 2016, now Pat. No. 10,487,191.

(51) Int. Cl.
*C08J 11/08* (2006.01)
*B29B 17/02* (2006.01)
(Continued)

(52) U.S. Cl.
CPC .............. *C08J 11/08* (2013.01); *B29B 17/02* (2013.01); *B29B 17/04* (2013.01);
(Continued)

(58) Field of Classification Search
CPC . B29B 17/02; B29B 17/04; B29B 2017/0293; B29K 2105/0872; B29K 2307/04; C08J 11/08; Y02W 30/62
See application file for complete search history.

(56) References Cited

U.S. PATENT DOCUMENTS

| 4,927,579 A | 5/1990 | Moore |
| 5,287,632 A | 2/1994 | Heit et al. |
| (Continued) | | |

FOREIGN PATENT DOCUMENTS

| JP | 365235 A | 3/1991 |
| JP | 2002011301 A | 1/2002 |
| (Continued) | | |

OTHER PUBLICATIONS

Allred et al.; "Chemical Recycling of scrap Composites"; Adherent Technologies; Albuquerque, New Mexico; N95-23034; 1994; pp. 177-188; https://ntrs.nasa.gov/archive/nasa/casi.ntrs.nasa.gov/19950016617.pdf.

(Continued)

*Primary Examiner* — Frances Tischler
(74) *Attorney, Agent, or Firm* — Snell & Wilmer L.L.P.

(57) ABSTRACT

Processing fiber-reinforced composite to recover reinforcing fibers includes first treating the composite with a normally-liquid first solvent for material of the matrix followed by second treating of solid residue including reinforcing fibers from the first treating with a normally-gaseous material contacted with the solid residue under conditions of temperature and pressure at which the normally-gaseous material is in a liquid or supercritical fluid form. Treating a crude product including released reinforcing fibers and residual material of the matrix and/or fiber sizing includes first converting a normally-gaseous substance from a fluid form to a solid form and thereafter second converting the solid form to a gaseous form, to assist dislodgment of such residual material.

16 Claims, 8 Drawing Sheets

(51) Int. Cl.
*B29B 17/04* (2006.01)
*B29K 307/04* (2006.01)
*B29K 105/08* (2006.01)

(52) U.S. Cl.
CPC .............. *B29B 2017/0293* (2013.01); *B29K 2105/0872* (2013.01); *B29K 2307/04* (2013.01); *Y02W 30/62* (2015.05)

(56) References Cited

U.S. PATENT DOCUMENTS

| | | | |
|---|---|---|---|
| 5,304,576 | A | 4/1994 | Martinez |
| 6,223,904 | B1 | 5/2001 | Stephan et al. |
| 6,626,193 | B1 | 9/2003 | Arrieta et al. |
| 8,877,872 | B2 | 11/2014 | Anderson et al. |
| 8,920,932 | B2 | 12/2014 | Adam |
| 9,776,107 | B1 | 10/2017 | Asmatulu et al. |
| 10,487,191 | B2 | 11/2019 | Maxey |
| 10,610,911 | B1 | 4/2020 | Maxey et al. |
| 2013/0150467 | A1 | 6/2013 | Kouno et al. |
| 2013/0192189 | A1 | 8/2013 | Lawrence et al. |
| 2014/0283348 | A1 | 9/2014 | Asmatulu |
| 2015/0273423 | A1 | 10/2015 | Engels et al. |
| 2016/0145409 | A1 | 5/2016 | Aymonier et al. |

FOREIGN PATENT DOCUMENTS

| | | |
|---|---|---|
| JP | 2005336331 A | 12/2005 |
| JP | 2008189723 A | 8/2008 |
| JP | 2013107973 A | 6/2013 |
| WO | 2013050942 A1 | 4/2013 |
| WO | 2014087003 A1 | 6/2014 |

OTHER PUBLICATIONS

Henry et al.; "Semi-continuous flow recycling method for carbon fibre reinforced thermoset polymers by near-and supercritical solvolysis"; Polymer Degredation and Stability; 2016; 38 pages.
Liu et al.; "Mild chemical recycling of aerospace fiber/epoxy composite wastes and utilization of the decomposed resin"; Polymer Degradation and Stability; vol. 139; 2017; pp. 20-27.
Marsh; "Recycling carbon fibre composites"; Materials Today; Apr. 22, 2009; http://www.materialstoday.com/carbon-fiber/features/recycling-carbon-fibre-composites/; 6 pages.
Nunes et al.; "Life cycle assessment of a steam thermolysis process to recover carbon fibers from carbon fiber-reinforced polymer waste"; Int. J. Life Cycle Assess; 2017; 14 pages.
Okajima et al.; "Chemical Recycling of Carbon Fiber Reinforced Plastic with Supercritical Alcohol"; Journal of Advanced Research in Physics 3(2); 2012; pp. 1-4.
Shibata et al.; "CFRP Recycling Technology Using Depolymerization under Ordinary Pressure"; Hitachi Chemical; Hitachi Chemical Technical Report No. 56; Mar. 2014; 8 pages.
Gosau et al.; "Carbon fiber reclamation from state-of-the-art 2nd generation aircraft composites"; International SAMPE Symposium and Exhibition (Proceedings). 54; (2009); 7 pgs.
"Composite Recycling and Disposal—An Environmental R&D Issue"; Boeing Environmental Technotes; Nov. 2003; vol. 8, No. 4; 4 pgs.
Gosau et al.; "Integrated Composite Recycling Process"; Proc. 38th; SAMPE Tech. Cont; Dallas, TX; Nov. 7-9, 2006; 7 pgs.
"1, 1, 1,2-Tetrafluoroethane." Wikipedia, Wikimedia Foundation, Jan. 29, 2017, web.archive.org/web/20170129194159/en.wikipedia.org/wiki/1, 1, 1,2-Tetrafluoroethane. (Year: 2017).
"Polymer Degradation." Wikipedia, Wikimedia Foundation, Jul. 31, 2017, web.archive.org/web/20170731022009/en.wikipedia.org/wiki/Polymer degradation. (Year: 2017).

RECOVERY OF REINFORCING FIBERS FROM FIBER-REINFORCED COMPOSITES

CROSS REFERENCE TO RELATED APPLICATIONS

The present application is a divisional of U.S. application Ser. No. 16/088,757 filed on Sep. 26, 2018 entitled "RECOVERY OF REINFORCING FIBERS FROM FIBER-REINFORCED COMPOSITES," which is a U.S. national stage of International App. No. PCT/US2016/024956 filed Mar. 30, 2016 entitled "RECOVERY OF REINFORCING FIBERS FROM FIBER-REINFORCED COMPOSITES," the entirety of which is incorporated by reference herein.

FIELD OF THE INVENTION

The invention relates to recovery of reinforcing fibers, such as carbon or other fibers, from composites including such reinforcing fibers held in a matrix of a plastic material or a precursor for a plastic material (e.g., a pre-preg material).

BACKGROUND OF THE INVENTION

Carbon fiber-reinforced polymers (CFRPs) are composite materials including carbon fibers as reinforcing agents bound in a matrix, typically a matrix of a plastic composition. CFRPs are used in a variety of consumer and industrial products. A high cost of virgin carbon fibers of industrial or commercial grade limits utilization in a broader-range of end-user applications, including limiting broader use in automotive and transportation sectors where there is significant potential for expanded use.

Even with the high cost of virgin carbon fibers, a significant quantity of CFRPs, and the carbon fibers therein, end up as waste. It is common in CFRP applications for material trim and scrap waste to amount to about 30% or more of finished part weight. This waste is often incinerated or sent to a landfill resulting in additional waste disposal costs and significant lost raw material value.

Such trim and scrap waste represent a possible resource for recycled carbon fibers, and attempts have been made to process such trim and scrap waste to recover carbon fibers for recycle. However, effectively freeing carbon fibers for recovery from CFRP matrix has proven difficult, with a result being that recycle processing has tended to be expensive and/or to result in significant degradation of carbon fiber properties, significantly limiting utility of recycling as a source of carbon fibers for a range of possible applications.

One CFRP recycling technique involves subjecting waste CFRP to pyrolysis. This technique utilizes high temperatures to decompose polymeric matrix while attempting to leave the reinforcing fibers intact. The carbon fibers recovered from this processing often have a short fiber length with limited potential for reuse in new products. Also, pyrolysis, as a process option, has significant limitations with respect to intensive energy requirements, high processing costs, and potential for negative environmental impact due to emission of pyrolysis by-products.

Another type of CFRP recycling technique uses chemical agents to chemically react with and degrade, and break down the polymeric matrix (sometimes referred to as depolymerization) to degradation products that may be separated from the carbon fibers, such as by dissolution of the degradation products into a solvent. Such processes tend to be expensive and may also degrade carbon fiber properties.

A need exists for improved processes to recover carbon fibers from CFRP waste for recycle in a manner that increases the range of applications in which recycled carbon fibers may be technically and economically suitable for use.

SUMMARY OF THE INVENTION

It has been found that many CFRP forms may be advantageously processed to recover high quality carbon fibers using a solvent-based process that does not depend upon chemical decompositions of the matrix of the CFRP. Advantageous variations on the solvent-based processing include effective separation and removal of residual solvent and finish cleaning of recovered carbon fibers, for example to remove remaining residual matrix material and/or to remove remaining fiber sizing material. The techniques disclosed herein are especially useful for processing CFRP that is in a pre-preg form, such as including an uncured thermoset resin matrix in which the carbon fibers are held. There is a significant quantity of such composite pre-preg waste that is generated in the form of scrap and trim waste, known as offal. Additional scrap waste results during manufacturing of product that fails to meet specification and expired pre-preg composite product that is not used within a specified shelf-life for the product. The solvent-based processing disclosed herein significantly reduces both processing complexity and energy requirements relative to pyrolysis and chemical depolymerization processes. This solvent-based processing is also applicable to composites including reinforcing fibers other than carbon fibers held in a matrix, but the disclosure herein is made with reference primarily to carbon reinforcing fibers, although the principles disclosed herein apply also to recovery and recycle of other reinforcing fibers. For brevity, reinforcing fibers are often referred to herein simply as fibers.

A first aspect of this disclosure is a method for processing a composite, including reinforcing fibers held in a matrix of a plastic material or precursor for a plastic material, for recovery of the reinforcing fibers. The method includes first treating the fiber-reinforced composite with a normally-liquid first solvent to prepare a first treated solid residue comprising the reinforcing fibers. The first treating includes contacting the fiber-reinforced composite with the first solvent and first dissolving at least a majority by weight of the matrix into the first solvent. The method includes, after the first treating, a second treating of at least a portion of the first treated solid residue comprising the reinforcing fibers with a normally-gaseous material to prepare second treated solid residue. The second treating includes contacting at least a portion of the first treated solid residue with the normally-gaseous material under conditions of temperature and pressure at which the normally-gaseous material is in a form of a liquid or supercritical fluid. Such second treating may be particularly beneficial for removing residual first solvent from the first treated solid residue and may also beneficially remove some additional residual matrix material.

A number of feature refinements and additional features are applicable to the first aspect of the disclosure. These feature refinements and additional features may be used individually or in any combination within the subject matter of the first aspect or any other aspect of the disclosure. As such, each of the following features may be, but are not required to be, used with any other feature or combination of features of the first aspect or any other aspect of the disclosure.

In preferred implementations, a majority or even most of the matrix is dissolved into the first solvent during the first treating. For example, the first treating may include dissolving into the first solvent at least 60 weight percent, at least 70 weight percent, at least 80 weight percent, at least 90 weight percent, at least 95 weight percent, at least 97 weight percent, at least 98 weight percent or even at least 99 weight percent or more of the matrix into the first solvent during the first treating. In some implementations, the first treating may include dissolving into the first solvent all (100 weight percent) or essentially all of the matrix. In some implementations, the first treating may including dissolving into the first solvent up to 99.8 weight percent, up to 99.5 weight percent, up to 99 weight percent, up to 98 weight percent, up to 97 weight percent, up to 95 weight percent or up to 90 weight percent of the matrix.

The dissolving during the first treating may be conducted at any convenient temperature (e.g., temperature of the first solvent during the dissolving), but typically at a temperature that is lower than a normal boiling point of the first solvent. In some implementations the temperature may be in a temperature range having a lower limit of 0° C., 10° C., 15° C., or 20° C.; and an upper limit of 40° C., 35° C., or 30° C. In some implementations, the temperature may be essentially ambient temperature. The dissolving may be conducted under an elevated pressure, but is often conducted at ambient pressure (approximately one bar). In some implementations, the pressure during the dissolving may be in a range having a lower limit of 0.08 MPa, 0.1 MPa, 0.15 MPa, or 0.2 MPa; and an upper limit of 2 MPa, 1 MPa, 0.7 MPa, 0.5 MPa, or 0.3 MPa.

The terms plastic material and plastic composition are used interchangeably herein. By the matrix of the fiber-reinforced composite being a plastic material it is meant a "set" plastic composition, which may be a thermoplastic material (reversibly set by thermal processing) or may be a cured thermoset composition (irreversibly set chemically, also referred to as a "thermoset"). By "precursor", "precursor composition", "thermoset precursor composition" or the like for a plastic material it is meant a preliminary composition that is to undergo additional chemical reaction to prepare that plastic material, which may be for example a final cured thermoset composition for a final thermoset matrix. Such a precursor may be an uncured thermoset resin (which may also be referred to as an uncured thermoset resin composition or thermoset prepolymer composition). As used herein, an "uncured" composition refers to precursor that has not been subjected to curing or has been only partially cured, such that additional curing is required to prepare the final plastic composition (e.g., to prepare a final thermoset). In contrast, a "cured" composition refers to such a final plastic composition after completion of all curing operations (e.g., a final thermoset). Such a precursor composition is typically malleable and re-formable in shape to at least some degree, whereas a cured thermoset composition may be irreversibly chemically set and may typically not be malleable or re-formable in shape (is permanently shaped). Curing typically involves one or more chemical reactions, often including cross-linking. A composite including reinforcing fibers and a matrix of such a precursor for a plastic material may be referred to as a "thermoset pre-preg composite", a "pre-preg composite" or even simply as "pre-preg". Curing of a precursor composition may be induced or caused by a variety of stimuli depending on the composition, for example through the application of heat and/or radiation. By "plastic material" or "plastic composition" it is meant a composition composed predominantly of polymer components, but which may include minor amounts of various additives, for example, plasticizer or other additives (e.g., various processing aids, mold release agents). Precursor compositions for a plastic material may include un-cross-linked polymer components and a variety of other components, for example curing agents (e.g., cross-linking agents), processing aids (e.g. viscosity modifiers), plasticizers and other additives.

Examples of some uncured thermoset resin compositions of a precursor composition may be or include: epoxy resins, phenolic resins, polyester resins, unsaturated polyesters, polyimide resins, polyimine resins, polyurethane resins, vinyl esters, cyanate esters, bismaleimides, benzoxazines, phthalonitriles, polybutadiene, and combinations thereof. Some example themoset matrix materials include any cured composition made using such example precursor compositions. Some specific thermoset matrix materials, or precursor compositions or components for such precursor compositions, include Recyclamine® (epoxy resin, Conora Technologies) and Recycloset™ (epoxy resin Adesso Advanced Materials). As noted, the composite may include a thermoset pre-preg composite. Such pre-preg may be or include scrap and/or trim pre-preg waste.

As noted, the matrix may be or include a thermoplastic composition. Some example thermoplastic compositions include those based on or including: polyolefins (e.g., including polyethylene, polypropylene and/or propylene-ethylene copolymers), polyethylene terephthalates (PET), polybutylene terephthalates (PBT), polycarbonates, acrylonitrile butadiene styrenes (ABS), polyamides, polyetheretherketones (PEEK), polyetherketones (PEK), polyamide-imides, polyarylsulfones, polyetherimides (PEI), polyethersulfones, polyphenylene sulfides, liquid crystal polymers, cyclic thermoplastic polyesters, and combinations thereof.

The fiber-reinforced composite may include a variety of matrix and fiber proportions. In some implementations the fiber-reinforced composite may comprise matrix in an amount in a range having a lower limit of 7 weigh percent, 10 weight percent, 15 weight percent, 20 weight percent, 25 weight percent, 30 weight percent, 35 weight percent, 40 weight percent, 45 weight percent, 50 weight percent, 55 weight percent or 60 weight percent and an upper limit of 85 weight percent, 80 weight percent, 70 weight percent, 65 weight percent, 60 weight percent, 55 weight percent, or 50 weight percent of the total weight of the fiber-reinforced composite, provided that the upper limit is larger than the lower limit. In some implementations, the fiber-reinforced composite may comprise reinforcing fibers in an amount in a range having a lower limit of 20 weight percent, 30 weight percent, 40 weight percent, 45 weight percent, 50 weight percent, 55 weight percent, or 60 weight percent; and an upper limit of 93 weight percent, 90 weight percent, 85 weight percent, 80 weight percent, 75 weight percent, 70 weight percent, or 65 weight percent of the total weight of the fiber-reinforced composite. The fiber-reinforced composite may include minor amounts of additional components, for example one of more of the following: fiber sizing, surface treatments on the fiber or on fiber sizing, dispersing agents, and compatibilizing agents. In some preferred implementations, the amount of any one or of all components other than the reinforcing fibers and matrix make up no more than 10 weight percent, no more than 5 weight percent, no more than 3 weight percent, or no more than 1 weight percent of the fiber reinforced composite. Although the fiber-reinforced composite may include one or more fillers, other than the reinforcing fibers, and which may be functional or non-functional in nature, in some preferred implementations the fiber-reinforced composite is free of or essentially free of any such other fillers.

The reinforcing fibers may include fibers of a single type or may include fibers of multiple different types. The reinforcing fibers may be limited to including only one of the following or any number of two or more of the following types of fibers: carbon fibers (preferred), carbon nanotube fibers, aramid fibers, glass fibers, boron fibers, basalt fibers, high-modulus polyethylene fibers, poly p-phenylene-2,6-benzobisoxazole fibers, quartz fibers, ceramic fibers, stainless steel fibers, titanium fibers, copper fibers, nickel fibers, metal coated fibers (e.g., coated with silver, gold, ruthenium, Miralloy®, alloys, etc.), natural fibers and mineral fibers. The fibers may include only a single material phase (e.g., fibers composed of a single, uniform material) or may be multi-phasic structures (e.g., metal coated fibers including a core of one material phase and different metal coating material phase). Such fibers will typically have a diameter in a micro-size range (e.g., 100 microns or smaller) or even a nano-size range (e.g., smaller than one micron).

The first solvent may be any liquid composition that is a solvent for material of the matrix, and that preferably is chemically nonreactive, and more preferably chemically inert, with respect to the reinforcing fibers. By a material being chemically nonreactive with respect to another material, it is meant that the material, under conditions of temperature and pressure during the relevant processing, is essentially not chemically reactive with the other material. By a material being chemically inert to another material, it is meant that the material, under conditions of temperature and pressure during the relevant processing, is essentially not chemically reactive with the other material and is essentially not a solvent for the other material. The first solvent may be a single component or may be a multi-component mixture of multiple components that together provide the desired solvating properties for dissolving material of the matrix. The first solvent may include any one or any combination of two or more of the following, with or without other additional components: methylene chloride (preferred), methoxy-nonafluorobutane, 2-methyltetrahydrofuran, tetrahydrofuran, tetrachloroethylene, n-propyl bromide, dimethyl sulfoxide, polyolester oil, esters, ethers, acetates, acids, alkalis, amines, ketones, glycol ethers, glycol ether esters, ether esters, ester-alcohols, alcohols, halogenated hydrocarbons, paraffinic hydrocarbons, aliphatic hydrocarbons, aromatic hydrocarbons, and combinations thereof.

In some preferred implementations, a result of the first treating is that most of the material of the matrix has been dissolved into the first solvent and the first treated solid residue is made up mostly of reinforcing fibers. For example reinforcing fibers may make at least 70 weight percent, at least 80 weight percent, at least 90 weight percent, at least 95 weight percent, at least 98 weight percent or even at least 99 weight percent or more (but often less than 100 weight percent) of the first treated solid residue. The first treated solid residue may include minor quantities of other material, other than the reinforcing fibers, for example some residual matrix material (e.g., undissolved or re-precipitated during processing) and/or fiber sizing material.

The method may typically include prior to the second treating (i.e., as part of processing during the first treating or between the first treating and the second treating) separating first solvent loaded with dissolved matrix material (rich first solvent) from the first treated solid residue. Such separation may include any liquid-solid separation technique, for example any one or more of the following: settling and decantation (including accelerated settling through centrifugal extraction), cyclone separation, and/or filtration. Filtration may, for example, involve filtration in which first solvent passes through filter medium as filtrate and first treated solid residue remains with retentate. Preferably a majority or even most of the first solvent will be separated from the first treated solid residue by such processing. However, even after such filtration or other liquid-solid separation, the first treated solid residue may still be in the presence of some amount of residual first solvent, which is problematic in terms of practical utility of the reinforced fibers in the first treated solid residue. In preferred processing, the normally-gaseous material in the liquid or supercritical form in the second treating acts as a second solvent (of a different composition than the first solvent) during the second treating to dissolve some, and preferably essentially all, such residual first solvent that remains in the presence of the first treated solid residue. Such liquid or supercritical fluid form may also have some solvating capability for dissolving some amount of the material of the matrix and or other material in the first treated solid residue, such as material of the fiber sizing that may remain in the first treated solid residue. However, it is typically preferred that such liquid or supercritical fluid form be a good solvent for the first solvent, with dissolution of additional residual matrix material or fiber sizing being a secondary, but not necessary benefit if available. It will be understood that terms such as "first solvent" and "second solvent" are for convenience of reference and do not mean or imply that processing necessarily includes more than one solvent or any particular number of different solvents, except as stated.

The normally-gaseous material may be comprised of a single normally-gaseous component or a normally-gaseous mixture of multiple different components wherein the mixture is normally-gaseous, whether or not all of the components of such mixture are normally-gaseous individually. Preferably, such a normally-gaseous mixture is made up essentially of only components that are each individually normally-gaseous. By a material being normally-gaseous it is meant the material is in the form of a gas at conditions of 0.1 MPa pressure and 25° C. temperature. By a material being normally-liquid it is meant the material is in the form of a liquid at conditions of 0.1 MPa pressure and 25° C. temperature. The terms material and substance are generic terms for compositions that include one or more than one component, and the terms are used interchangeably herein. Different ones of these terms may be used in different portions of this disclosure for convenience of reference. Some example materials that may be or may be a part of the normally-gaseous material include any one or any combination of two or more of the following, with or without the presence of any other component or components: carbon dioxide, 1,1,1,2-tetrafluoroethane, difluoromethane, pentafluoroethane, and combinations thereof. In preferred implementations, the normally-gaseous material is chemically nonreactive, and even more preferably is chemically inert, with respect to the reinforcing fibers. A preferred normally-gaseous material for the second treating comprises carbon dioxide, and more preferably consists essentially of carbon dioxide.

As noted, during the contacting of the second treating the normally-gaseous material is in the form of a liquid or a supercritical fluid. The pressure at which such contacting is conducted, may often be within a range having a lower limit of 3 MPa, 3.5 MPa, 4 MPa, 5 MPa, 7 MPa, 7.39 MPa, or 7.5 MPa; and an upper limit of 69 MPa, 50 MPa, 40 MPa, 30

MPa, 20 MPa, or 10 MPa, and such a range is particularly preferred in the case of carbon dioxide as the normally-gaseous material. The temperature of the contacting of the second treating may often be within a range having a lower limit of 0° C., 10° C., 13° C., 15° C., 20° C., or 30° C. and an upper limit of 175° C., 150° C., 125° C., 100° C., 75° C., 60° C., 50° C., or 40° C., provided that the upper limit is higher than the lower limit, and such a range is particularly preferred in the case of carbon dioxide as the normally-gaseous material. As will be appreciated, a supercritical fluid refers to a fluid at a temperature and pressure above the critical temperature and critical pressure for the material, for example at a temperature above 31.1° C. and a pressure above 72.9 atmospheres (7.39 MPa) in the case of carbon dioxide as the normally-gaseous material.

During the first treating, the dissolution of matrix material may be conducted to a degree to remove a majority or even most of the material of the matrix to release the fibers, so that after the first and second treating, the fibers are in a free form no longer bound in a matrix. However, even after the first and second treating there may be residual matrix material still clinging to some of the released fibers.

Also, carbon fibers and also some other reinforcing fibers are often made with a layer of material, called fiber sizing or simply sizing, that may for example provide one or more of the following functions: protecting the fiber, preventing fiber agglomeration, improving processability of the fibers, and acting as a compatibility agent to improve dispersibility in and/or binding with matrix material. For many recycling applications, it is desirable to clean the reinforcing fibers of some or all such residual matrix material and/or sizing material. In other applications, such residual matrix material and/or some retained sizing material may not be a problem. However, for higher value recycling applications, it may be preferred to remove both residual matrix material and sizing material to provide clean fibers, which may then be processed to add new sizing to the fibers if desired. For purposes of this disclosure, fiber sizing is not considered a part of either a reinforcing fiber or a matrix, and is separate from each of those terms. Rather, to the extent that reinforcing fibers of a fiber-reinforced composition are coated with fiber sizing, that fiber sizing is a separate material from the reinforcing fibers and from the matrix, even though the fiber sizing may provide a binding intermediate between the reinforcing fiber and the matrix.

The method may include a third treating after the second treating. Such third treating may include further treating at least a portion of the second treated solid residue, including the reinforcing fibers, by first converting a normally-gaseous substance in contact with such second treated solid residue from a fluid form to a solid form. After the normally-gaseous substance is in the solid form, the third treating includes second converting of the normally-gaseous substance from the solid form to a gaseous form. Such third treating may significantly assist dislodgment from the reinforcing fibers of residual material that may include material of the matrix and/or material of fiber sizing. During the second converting, rapidly expanding gas may mechanically dislodge significant residual matrix material and/or sizing material from the fibers. Such second converting may involve rapid sublimation from the solid form to the gaseous form.

The first converting of such third treating may include reducing the temperature of the normally-gaseous substance from a higher first temperature to a reduced second temperature. Such a higher temperature may often be at least 0° C., at least 5° C., at least 10° C., at least 15° C., or at least 20° C.; although often the higher temperature may be no higher than 100° C., no higher than 50° C., no higher than 40° C., or no higher than 30° C. The higher temperature may typically be ambient temperature. Such a reduced temperature may be −40° C. or lower, −50° C. or lower, −56.6° C. or lower, −60° C. or lower, or −70° C. or lower. At such a higher first temperature, the normally-gaseous substance is under conditions of temperature and pressure at which the normally-gaseous substance is in the form of a gas, liquid or supercritical fluid, and preferably a liquid. At the reduced temperature, the normally-gaseous substance is under conditions of temperature and pressure at which the normally-gaseous material is in the form of a solid. In some implementations, the conditions at the reduced temperature include ambient pressure (approximately one bar). In some implementations, the conditions at the higher temperature include elevated pressure relative to ambient pressure (e.g., higher than atmospheric pressure).

The first converting may include significantly reducing pressure of the normally-gaseous substance from an elevated pressure, and reducing the temperature of the normally-gaseous substance may include gas expansion cooling as the pressure is reduced. The elevated pressure may be at least 3.0 MPa, at least 3.5 MPa, at least 4 MPa, at least 5 MPa, at least 7 MPa, at least 7.39 MPa, or at least 7.5 MPa. The elevated pressure may be a pressure as described above for the pressure during the contacting during the second treating. The reducing pressure may include reducing the pressure of the normally-gaseous substance from the elevated pressure to a lower pressure of 1 MPa or lower, 0.750 MPa or lower, 0.5 MPa or lower, 0.250 MPa or lower, or even 0.15 MPa or lower, or even to about ambient pressure (approximately one bar). In some preferred implementations when using carbon dioxide as the normally-gaseous substance, the reducing temperature may include reducing the temperature to a temperature at or below the triple point for carbon dioxide (−56.6° C.) and preferably even lower (e.g., at or below −60° C.), or even to a temperature at or below the normal sublimation point of carbon dioxide (−78.5° C.). Similarly, when using carbon dioxide as the normally-gaseous substance, such a lower pressure of such a reducing pressure step may preferably be at or below the triple point pressure of carbon dioxide (0.518 MPa), and more preferably below such a triple point pressure (e.g., at or close to ambient pressure).

The second converting preferably includes rapidly converting the normally-gaseous substance from the solid form to the gaseous form in a short time period for effective dislodgment of residual matrix material and/or sizing material. Such a time period may be, for example, no greater than 120 seconds, no greater than 60 seconds, no greater than 45 seconds, no greater than 30 seconds, no greater than 20 seconds, no greater than 15 seconds, no greater than 10 seconds, or no greater than 5 seconds, although such time period may often be at least 1 second. The second converting may include contacting second treated solid residue with a heat transfer fluid at a greater temperature than the reduced temperature of the solid form of the normally-gaseous material, for example, with the temperature of the heat transfer fluid immediately prior to contacting with the second treated solid residue being at least 5° C. greater than, at least 10° C. greater than, at least 25° C. greater than, at least 50° C. greater than, at least 75° C. greater than, at least 100° C. greater than or even at least 150° C. greater than the reduced temperature, although often also being not more than 225° C. greater than the reduced temperature. The heat transfer fluid may be in the form of a gas, liquid, or a supercritical fluid when contacted with the second treated solid residue and the solid form of the normally-gaseous material. Some example heat transfer fluids include an oil, liquid water, steam (saturated or superheated), air, nitrogen, and carbon dioxide. The second converting may include rapid sublimation of the normally-gaseous substance from the solid form.

The normally-gaseous substance of the third treating may be any normally-gaseous material that may be subjected to such first and second converting. Some example materials for the normally-gaseous substance for the third treating include any of the normally-gaseous materials, or combinations thereof, identified for the normally-gaseous material of the second treating, with carbon dioxide being preferred for use in both the second treating and the third treating. The normally-gaseous substance of the third treating may be of the same composition or a different composition than the normally-gaseous material of the second treating. In some preferred implementations, the normally-gaseous substance of the third treating is the same as the normally-gaseous material of the second treating, and in more preferred implementations, the normally-gaseous substance of the third treating is made up of some or all of the normally-gaseous material of the second treating that remains in contact with the second treated solid residue at the conclusion of the second treating (e.g., carbon-dioxide remaining from the second treating).

The second treated solid residue resulting from the second treating should preferably be mostly free from the presence of the first solvent and more preferably should be essentially free of the presence of the first solvent, or stated in a different way the second treated solid residue is preferably essentially in a completely dried state relative to the first solvent. The second treated solid residue will also typically have a very high content of the reinforcing fibers, but may still contain some minor amounts of other materials (e.g., residual matrix material and/or fiber sizing material). The reinforcing fibers may, for example make up at least 90 weight percent, at least 95 weight percent, at least 98 weight percent, or even at least 99 weight percent or more (e.g., essentially 100 weight percent) of the second treated solid residue. The second treated solid residue may have essentially the same composition as the first treated solid residue, but dried of the first solvent, for example, when the second treating is essentially in the absence of any significant dissolution of residual matrix material or fiber sizing into the liquid or supercritical fluid form of the normally-gaseous material. Alternatively, the second treated solid residue may have a higher weight percentage of reinforcing fibers and a correspondingly lower weight percentage of other materials, for example when the liquid or supercritical fluid form of the normally-gaseous material dissolves some portion of residual matrix material or fiber sizing material.

When the method includes the third treating, a product of such third treating may be third treated solid residue, which may be a cleaned product after separating dislodged pieces of material of matrix and/or fiber sizing, for example by flushing them away with heat transfer fluid, effluent of the normally-gaseous substance or another flushing fluid. Such a cleaned product may include mostly or even essentially all reinforcing fibers and preferably with a reduced content or even essentially free of residual material of the matrix and/or fiber sizing. The reinforcing fibers may make up at least 90 weight percent, at least 93 weight percent, at least 96 weight percent, at least 98 weight percent, at least 99 weight percent, at least 99.5 weight percent, or at least 99.8 weight percent of such a cleaned product.

The method may include additional processing steps, for example, before the first treating (e.g., to prepare a feed of the fiber-reinforced composite to the first treating), between the first treating and the second treating (e.g., liquid-solid separation or thermal drying to vaporize a portion of residual first solvent) or after the second treating (e.g., a third treating). Likewise the first treating may include processing in addition to the dissolving and the second treating may include processing in addition to the contacting. The method may include multiple first treating, second treating and/or third treating steps, which may be consecutive or separated by one or more intervening processing steps.

The method may also include ancillary operations, for example, for recovering, treating and/or recycling one or more of the following:

first solvent used to dissolve matrix material during the first treating, matrix material dissolved into the first solvent during the first treating, and normally-gaseous material used in the second treating.

For example, the method may include recovering rich first solvent from the first treating, with the rich first solvent being rich in dissolved material of the matrix, distilling the rich first solvent to vaporize first solvent, and preferably accompanied by precipitation of solids of the material of the matrix. Distilled vapor of the first solvent may be condensed and recycled as feed to the first treating. Precipitated solids of matrix material may be recovered (e.g., by filtration of distillation bottoms) and may be recycled.

As another example, the method may include recovering some or all of the normally-gaseous material from the second treating, recovering any dissolved material from the normally-gaseous material following the second treating (e.g., through pressure reduction to reduce solubility and/or distillation to convert the normally-gaseous material to a gas form at elevated pressure), or separating from the normally-gaseous material any suspended fine solids that may be mixed with the normally-gaseous material as recovered from the second treating. Cleansed normally-gaseous material may then be compressed and/or subjected to temperature adjustment as needed and recycled as feed for additional use in the second treating operation. The normally-gaseous substance of the third treating may also be recovered following the second converting and likewise processed and recycled.

A second aspect of this disclosure concerns a method for processing a crude product containing reinforcing fibers recovered from a composite including the reinforcing fibers held in a matrix of a plastic material or a precursor for plastic material, wherein the crude product comprises some residual material of one or both of the matrix and fiber sizing on the reinforcing fibers. The method includes, with the crude product in the presence of the normally-gaseous substance, converting the normally-gaseous substance from a fluid form to a solid form in contact with the crude product, the first converting comprising reducing the temperature of the normally-gaseous substance. The method includes, after the first converting, second converting the normally-gaseous substance in the solid form from the solid form into a gaseous form, to assist dislodgment of at least a portion of the residual material from the reinforcing fibers.

A number of feature refinements and additional features are applicable to the second aspect of the disclosure. These feature refinements and additional features may be used individually or in any combination within the subject matter of the second aspect or any other aspect of the disclosure. As such, each of the following features may be, but are not required to be, used with any other feature or combination of features of the second aspect or any other aspect of the disclosure.

The crude product may be or include first treated solid residue from processing according to the first treating of the first aspect of this disclosure and/or may include second treated solid residue from processing according to the second treating of the first aspect of this disclosure, or the crude product may be or include a product prepared by alternative processing of fiber-reinforced composite to release reinforcing fibers from matrix for recovery. Such alternative processing may include, for example, pyrolysis processing to remove material of the matrix material, chemical processing to chemically degrade or depolymerize material of the matrix, or processing in which material of the matrix is dissolved into a solvent. Any one or more of the reinforcing fibers, material of the matrix, and fiber sizing may be as described herein in relation to the first aspect. The method of the second aspect may be or include any feature or combination of features of the third treating option of the first aspect of this disclosure. For example, any one or more of the first converting, the second converting and the normally-gaseous substance of the method of the second aspect may be as described in relation to those similarly named features of such third treating of the method of the first aspect. The method of the second aspect may include any feature or any combination of any features of the first aspect of this disclosure, including of the first treating, the second treating or any ancillary processing. A product of the method may be a cleaned product made up mostly of reinforcing fibers and cleaned of at least a portion of residual matrix material and/or fiber sizing material that were clinging to the reinforcing fibers in the crude product. Such a cleaned product may be or have any property or combination of properties as described above for the cleaned product from the third treating described with respect to the first aspect.

A third aspect of this disclosure concerns a method for recycling reinforcing fibers from a fiber-reinforced composite including the reinforcing fibers in a matrix comprising a thermoplastic polymer composition or an uncured thermoset resin composition. The method includes treating the fiber-reinforced composite with a solvent comprising methylene chloride, wherein the treating comprises contacting the fiber-reinforced composite with the solvent and dissolving at least a majority by weight of the matrix into the solvent.

A number of feature refinements and additional features are applicable to the third aspect of the disclosure. These feature refinements and additional features may be used individually or in any combination within the subject matter of the third aspect or any other aspect of the disclosure. As such, each of the following features may be, but are not required to be, used with any other feature or combination of features of the third aspect or any other aspect of the disclosure.

The method of the third aspect may be or involve the first treating of the first aspect of this disclosure, with the first solvent comprising methylene chloride (also known as dichloromethane). In some preferred implementations, the methylene chloride makes up at least a majority by weight of the solvent, and more preferred is for the solvent to consist essentially of methylene chloride. The method of the third aspect may include any ancillary processing described in relation to the first aspect concerning recovering rich solvent and processing such rich solvent, for example to recycle solvent and/or to recover precipitated solid material of the matrix.

Other aspects, feature refinements and additional features are disclosed in and/or will be apparent from the drawings in conjunction with the summary provided above and the description that follows and from the appended claims.

DETAILED DESCRIPTION

Figure 1:
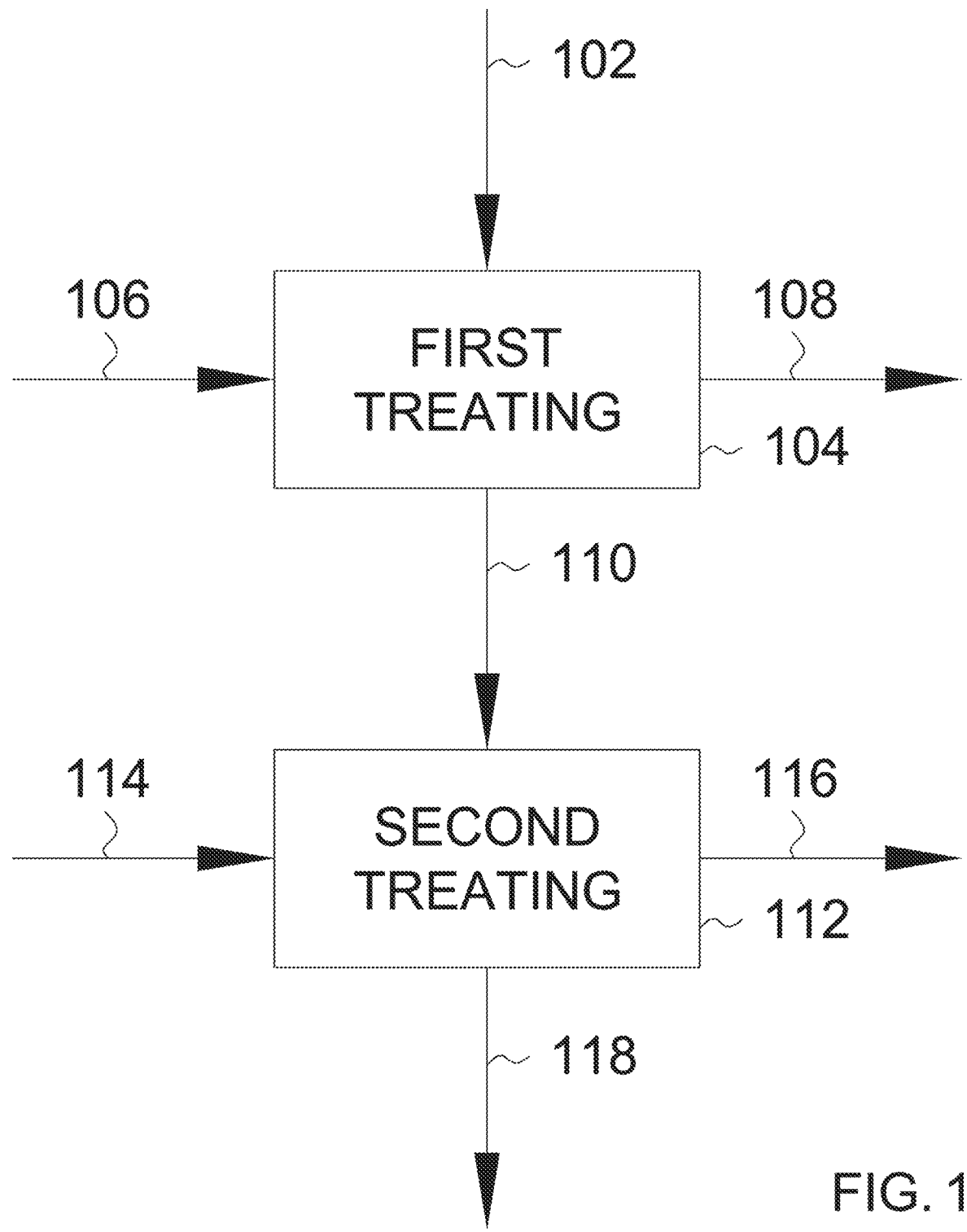
FIG. 1 is a generalized process block diagram illustrating an example of processing of an aspect of this disclosure.

FIG. 1 show a generalized process block diagram illustrating some example implementations of a method for processing a fiber-reinforced composite for recovery of reinforcing fibers. In the generalized processing shown in FIG. 1, a feed of a fiber-reinforced composite 102 is subjected to first treating 104 during which the composite 102 is contacted with a first solvent 106 under conditions to dissolve into the first solvent 106 at least a majority by weight of the matrix of the composite 102. Rich first solvent 108 including dissolved material of the matrix from the first treating 104 may be recovered and processed as desired, for example to recover material of the matrix and prepare lean first solvent for recycle back to the first treating 104 as part of the first solvent 106 feed. A result of the first treating is first treated solid residue 110, at least a portion of which is subjected to second treating 112. The first treated solid residue 110 includes the reinforcing fibers freed from the matrix of the composite 102, but still in the presence of residual first solvent. During the second treating 112, at least a portion of the first treated solid residue 110, and preferably all or essentially all of the first treated solid residue 110, is contacted with a second solvent 114. Rich second solvent 116 containing dissolved first solvent 106 that is removed from the presence of the first treated solid residue 110 during the second treating 112 may be recovered from the second treating 112 and processed as desired. The second solvent 114 may also dissolve some of and/or carry away some particulates of residual material of the matrix that may remain in the first treated solid residue 110 following the first treating 104. A result of the second treating 112 is a second treated solid residue 118 that has been cleansed of at least a portion, and preferably essentially all, residual first solvent 106 associated with the first treated solid residue 110 following the first treating, and preferably the second treated solid residue 118 also has been cleansed of at least a portion of residual material of the matrix that may remain in the first treated solid residue 110 following the first treating 104. Preferably, the second treated solid residue 118 is made up almost entirely of reinforcing fibers, although such reinforcing fibers may still be associated with a small residual amount of matrix material and and/or some fiber sizing material in the form of a thin coating on the reinforcing fibers when the reinforcing fibers are of a type that originally were protected by a coating of sizing material prior to manufacture of the composite 102.

With continued reference to FIG. 1, the first solvent 106 is a normally-liquid material (e.g., methylene chloride) with a significant solvating capacity for dissolving and carrying away material of the matrix from the composite 102, and the first solvent is contacted with the composite 102 under conditions of temperature and pressure at which the first solvent 106 is in a liquid form. In contrast, the second solvent 114 is a normally-gaseous material (e.g., carbon dioxide) that is contacted with the first treated solid residue 110 under conditions of temperature and pressure at which the second solvent 114 is in the form of a liquid or supercritical fluid. In some implementations, the second treated solid residue 118 may remain in a mixture with some of the second solvent 114, which may be beneficial for some further optional processing of the second treated solid residue, for example processing of a type as illustrated in FIG. 2 or 3, discussed below.

Figure 2:
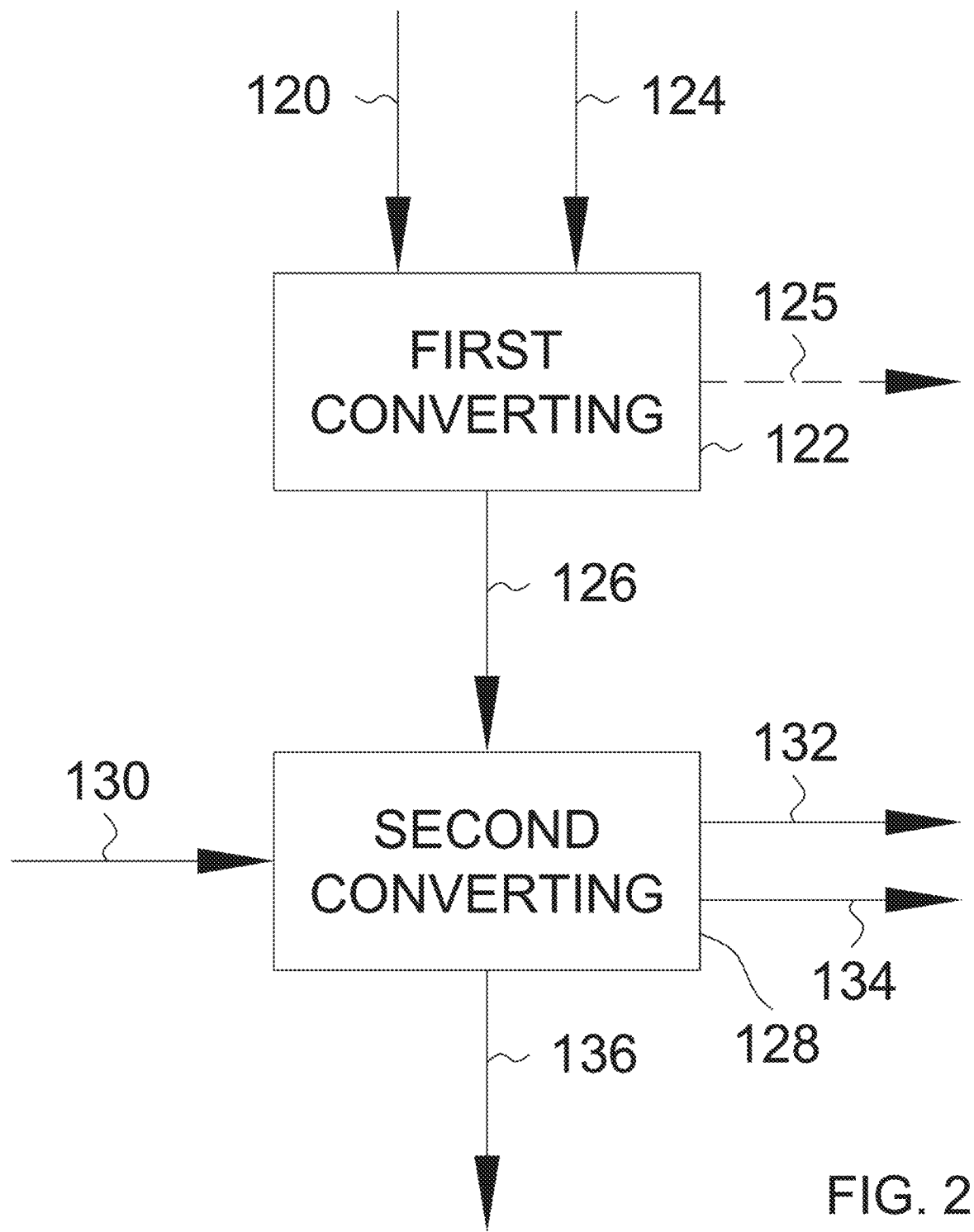
FIG. 2 is a generalized process block diagram illustrating another example of processing of an aspect of this disclosure.
Figure 3:
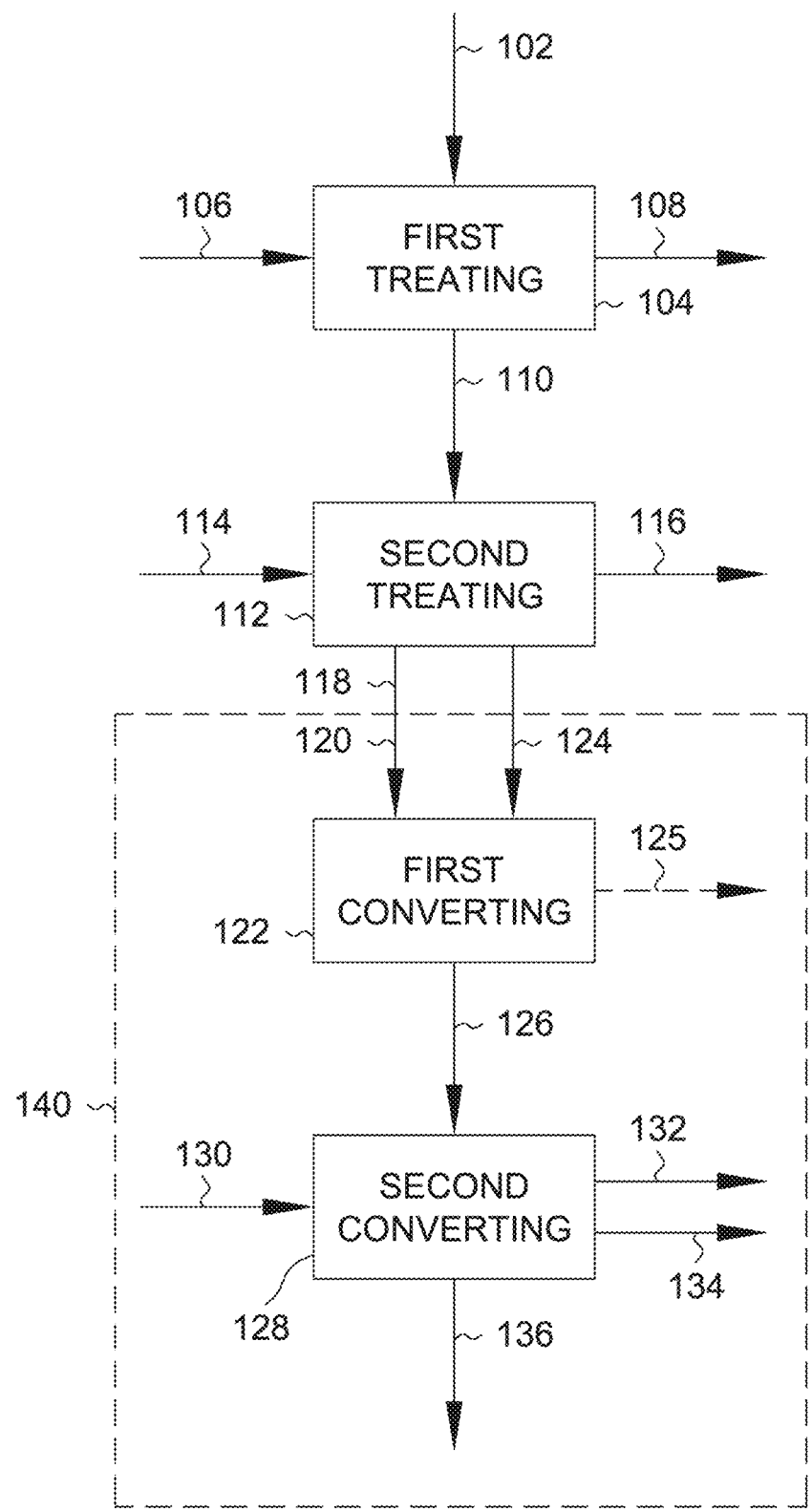
FIG. 3 is a generalized process block diagram illustrating another example of processing of an aspect of this disclosure.

Reference is now made to FIG. 2 which shows a generalized process block diagram illustrating some example implementations of a method for processing a crude product containing reinforcing fibers recovered from prior processing of a composite including the reinforcing fibers. As shown in FIG. 2, a feed of such a crude product 120 and a feed of a fluid form 124 of a normally-gaseous substance are subjected to a first converting step 122 in which, in the presence of the crude product, the normally-gaseous substance is converted from the fluid form 124 (i.e., liquid, gas or supercritical fluid) to a solid form in contact with the crude product. The feed of the crude product 120 preferably is made up mostly of freed reinforcing fibers, but may typically include some residual matrix material and/or fiber sizing material. During the first converting step 122, the temperature of the normally-gaseous substance is reduced, which may accompany a change in pressure of the normally-gaseous substance. In an example implementation, the first converting step may involve gas expansion cooling associated with reducing the pressure of the normally-gaseous substance from a high-pressure state to a low-pressure state. For example, during the first converting step 122 a mixture of the crude product and the normally-gaseous substance may be initially contained in a pressure vessel with the normally-gaseous substance under very high pressure in a form of a high pressure gas, liquid or supercritical fluid. The pressure vessel may then be depressurized through venting of a portion, or even most, of the normally-gaseous substance as a vent stream 125 from the pressure vessel at a sufficiently rapid rate to reduce the temperature within the pressure vessel to a temperature at which at least a portion of the normally-gaseous substance initially in the pressure vessel is cooled sufficiently to convert to a solid form in contact with the crude product in the depressurized pressure vessel. Such a vented portion of the normally-gaseous substance is illustrated in FIG. 2 by a vent stream 125 shown as a dashed line.

A result of the first converting 122 is a mixture 126 including the crude product and the solid form of the normally-gaseous substance. Preferably, such solid form is present in void spaces in and around residual matrix material and fiber sizing material, and with a portion of the solid form impregnating the residual matrix material and fiber sizing material. Such impregnation may result from penetration, such as by diffusion, of the fluid form of the normally-gaseous substance into such residual matrix material and fiber sizing material, with some of such penetrating fluid then converting to the solid form within the matrix material and fiber sizing material as the pressure and temperature are reduced.

After the first converting step 122, the mixture 126 including the crude product and the solid form of the normally-gaseous substance is subjected to a second converting step 128, during which the normally-gaseous substance of the mixture 126 is converted from the solid form into a gaseous form, and preferably at a very rapid rate. In that regard, the second converting step 128 may include rapid sublimation of the solid form to the gaseous form. During the second converting step 128 as illustrated in FIG. 2, heat is supplied to rapidly convert the solid form of the normally-gaseous substance to a gaseous form by contacting the mixture 126 with a heat transfer fluid 130. This may be accomplished in any way to quickly warm the mixture 126. In the example illustrated in FIG. 2 the heat is supplied by contacting the mixture 126 with the heat transfer fluid 130 that is at a higher temperature than the temperature of the mixture 126. As shown in FIG. 2, a feed of a heat transfer fluid 130 is fed to the second converting to contact and warm the mixture 126 and cause conversion of the solid form of the normally-gaseous substance to the gaseous form. Such a feed of heat transfer fluid 130 may be, for example, in the form of a liquid (e.g., heated water, heated oil), a gas (e.g., steam, carbon dioxide, nitrogen), or multiphase (e.g., saturated steam/water mix). In the example shown in FIG. 2, effluent 132 of the normally-gaseous substance in gaseous form and effluent 134 of the heat transfer fluid are removed from the second converting 128, and may be recovered separately or in a mixture from the second converting 128. A cleaned product 136 is recovered from the second converting 128. The cleaned product 136 includes the reinforcing fibers cleaned of at least a portion of residual material of the matrix and/or sizing material that were present in the feed of the crude product 120. Particles of dislodged matrix material and/or sizing material may be recovered with effluent 132 of the normally-gaseous substance and/or the effluent 134 of the heat transfer fluid. The feed of the crude product 120 to the processing of FIG. 2 may result from any prior processing. In some implementations, the crude product 120 that is fed to the processing of FIG. 2 may be provided by first treated solid residue 110 or second treated solid residue 118 prepared in the processing shown in FIG. 1.

FIG. 3 is a generalized process block diagram illustrating some example implementations of processing including the first treating 104 and second treating 112 of FIG. 1 combined with third treating 140 including the first converting 122 and the second converting 128 of FIG. 2, in which second treated solid residue 118 from the second treating 112 is used as the feed of crude product 120 for the first converting 122. The same reference numerals are used in FIG. 3 to refer to like features shown in and described in relation to FIGS. 1 and 2, except as stated otherwise. In the processing of FIG. 3, a portion of the second solvent 114 from the second treating 112 is used as the feed of the fluid form 124 of a normally-gaseous substance to the first converting 122. Such feed of the fluid form 124 of a normally-gaseous substance may be, for example, relatively clean fluid following flushing out most of the residual first solvent 106 from the first treated solid residue 110 during the second treating 112, which is recovered in the rich second solvent 116. In the example processing of FIG. 3, the first treating 104, second treating 112, first converting 122 and the second converting 128 may be as described previously with reference to FIGS. 1 and 2.

In the processing shown in FIGS. 1 and 3, the first treating 104 and second treating 112 may be performed in a single process vessel or may be performed in separate process vessels. The first treating 104 may be performed in a liquid containment vessel that need not be a pressure vessel, whereas the second treating 112 will typically be performed in a pressure vessel. The first treating 104 and second treating 112 may be performed in a batch, continuous or semi-continuous operation. In the processing of FIGS. 2 and 3, the first converting 122 and the second converting 128 will each typically be performed in a pressure vessel, and which may be in a single pressure vessel or in separate pressure vessels. The first converting 122 and the second converting 128 may be performed in a batch, continuous or semi-continuous operation. For continuous or semi-continuous processing, the first converting 122 and second converting 128 will typically be performed in separate pressure vessels. For batch processing, the first converting 122 and second converting 128 may conveniently be performed in a single pressure vessel.

Figure 4:
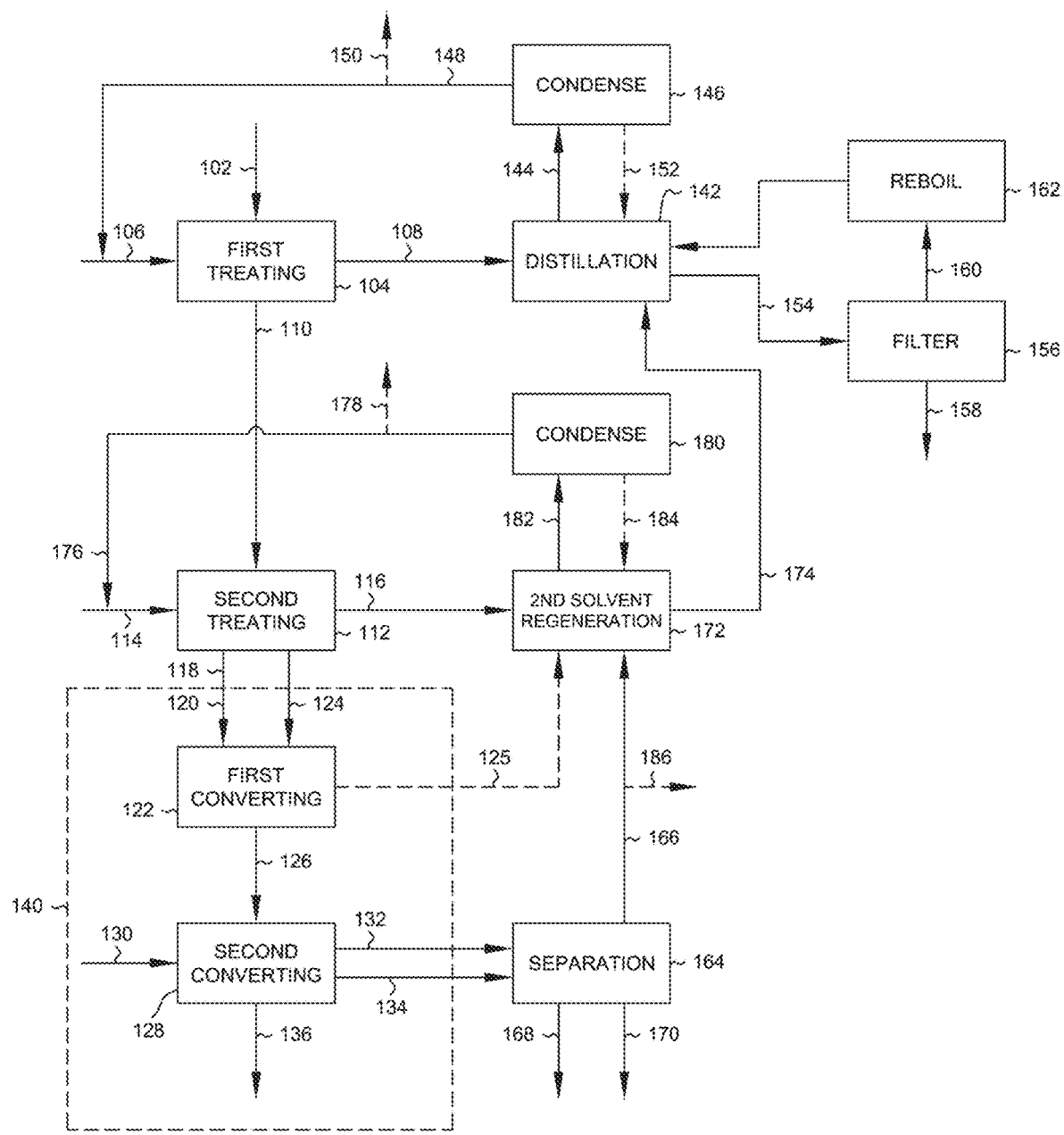
FIG. 4 is a generalized process block diagram illustrating another example of processing of an aspect of this disclosure.

FIG. 4 is a generalized process block diagram showing the same example processing as shown in FIG. 3, but also illustrating examples of some ancillary processing to treat rich first solvent 108 to recover matrix material, to recycle lean first solvent for reuse and to regenerate second solvent. The same reference numerals are used in FIG. 4 to identify like features as are shown and described in relation to FIGS. 1-3. In the example processing shown in FIG. 4, the rich first solvent 108 is subjected to distillation 142 to remove dissolved matrix material and to regenerate clean first solvent for reuse. During the distillation 142, overhead including first solvent vapor 144 is collected and subjected to a condensing operation 146 to condense first solvent vapor and prepare regenerated lean first solvent 148 in liquid form that may be recycled for use to prepare additional feed of the first solvent 106 to the first treating 104. FIG. 4 also shows an optional bleed 150 to remove first solvent as needed. Optionally, some condensed first solvent 152 may be returned to the distillation 142 as reflux. Distillation bottoms 154 containing liquid first solvent and precipitated material of the matrix are subjected to a filtration operation 156. A retentate portion 158 including precipitated solids of the matrix material is recovered and a filtrate portion 160 is subjected to a re-boil 162 to vaporize first solvent for return to the distillation 142.

The effluent 132 of the normally-gaseous substance (second solvent) and the effluent 134 of the heat transfer fluid from the second converting 128 are processed in a separation operation 164. The effluents 132 and 134 may be partly or entirely in a combined stream. In the separation operation 164, second solvent may be flashed from the heat transfer fluid to prepare recovered normally-gaseous substance 166 and solids (e.g., of matrix material and/or fiber sizing) may be filtered from the heat transfer fluid to prepare recovered heat transfer fluid 168 and recovered solids 170. The vent 125 of normally-gaseous substance (second solvent) from the first converting 122, the recovered normally-gaseous substance 166 and the rich second solvent 116 may be processed through a second solvent regeneration operation 172. A bleed 186 of second solvent may optionally remove second solvent from the system as needed. In the second solvent regeneration operation 172, first solvent 106 dissolved in the rich second solvent 116 may be recovered as a recovered first solvent 174, such as by distillation of the rich second solvent 116 to convert the rich second solvent 116 to a gas form and to precipitate first solvent. During the second solvent regeneration operation 172, overhead including second solvent vapor 182 is collected and subjected to a condensing operation 180 to condense second solvent vapor and prepare regenerated lean second solvent 176 in liquid form that may be recycled for use to prepare additional feed of the second solvent 114 to the second treating 112. FIG. 4 also shows an optional bleed 178 to remove second solvent as needed. Optionally, some condensed second solvent 184 may be returned to the second solvent regeneration 172 as reflux. The recovered first solvent 174 may be further processed in the distillation 142.

EXAMPLES

The following examples further illustrate and describe various aspects of this disclosure.

Samples of 14002-D carbon fiber unidirectional pre-preg composite (Rock West Composites) are subjected to testing for different processing combinations for recovery of carbon fibers for recycling. 14002-D is a fiber-reinforced composite pre-preg including PYROFIL® TR50S carbon fibers (Mitsubishi Rayon Co., LTD) in a matrix of Newport 301 epoxy resin (Mitsubishi Rayon Carbon Fiber & Composites, Inc., formerly Newport Adhesives and Composites, Inc.). Test samples of 14002-D are pieces about 15×2.5 centimeters in size and weighing about 0.8 gram that are cut from sheets of 14002-D. Testing is performed on samples in a tubular test vessel with an internal fluid containment volume of about 0.25 liters and that is designed to withstand high pressures. In the examples described below, reference to a sample refers to sample solids being subjected to test processing, and may for example refer to an initial sample of the 14002-D pre-preg composite at the commencement of testing or to a carbon fiber-containing solid residue at some point later during testing. Testing includes one or more of the following processing steps performed in the test vessel:

Solvent wash (SW): Sample is immersed in a bath of methylene chloride solvent, generally at room temperature, for a residence time of about 15 minutes, to dissolve material of the matrix from the sample, after which the methylene chloride solvent with dissolved matrix material is removed from the test vessel.

Liquid $CO_2$ rinse ($LCO_2$): Sample is immersed in liquid carbon dioxide at a pressure of about 5.5 MPa and a temperature of about 18° C. for a residence time of about 57 minutes.

Supercritical $CO_2$ rinse ($SCCO_2$): Sample is immersed in supercritical carbon dioxide at a pressure of about 10 MPa and temperature of at least 31.1° C. (critical temperature) for a residence time of about 5 minutes.

Hot water rinse (HWR): Sample is rinsed with hot tap water (temperature about 60° C. to 75° C.) that is introduced into the test vessel and is left in contact with the sample for about 5 minutes.

Rapid $CO_2$ sublimation (RSub): Following a $CO_2$ rinse (a liquid $CO_2$ rinse in the examples presented here), the test vessel is rapidly depressurized from a high pressure to essentially ambient pressure by rapid venting of carbon dioxide, which is accompanied by production of solid carbon dioxide in the test vessel in presence of the sample due to gas expansion cooling. Following depressurization of the test vessel, the sample in the presence of the solid carbon dioxide is subjected to a hot water rinse (same procedure as HWR described above) to rapidly sublimate the solid carbon dioxide.

Table 1 summarizes processing steps performed in each of 7 examples, with the processing steps listed in the sequence of performance in the test vessel for each of the examples.

For convenient reference, the processing steps are identified by the abbreviated designations provided above in parentheses.

TABLE 1

| Example No. | SW | HWR | $LCO_2$ | $SCCO_2$ | RSub | $LCO_2$ | RSub |
|---|---|---|---|---|---|---|---|
| 1(B) | x | | | | | | |
| 2(C) | x | x | | | | | |
| 3(D) | x | | x | | | | |
| 4(L) | x | | | x | | | |
| 5(F) | x | | x | | x | | |
| 6(G) | x | | x | | | x | x |
| 7(H) | x | | x | | x | x | x |

Figure 5:
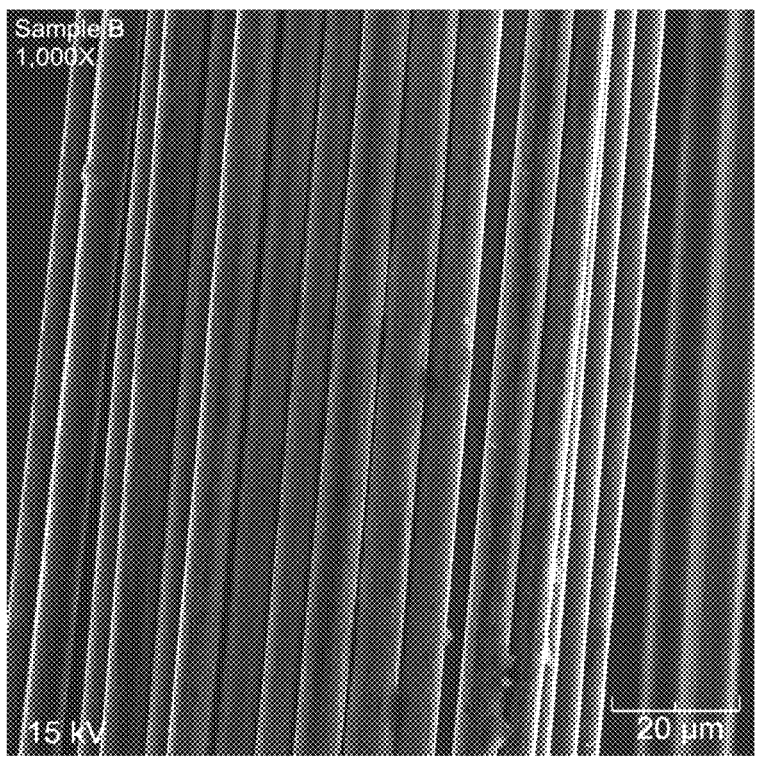
FIGS. 5-11 are SEM images of recovered carbon fibers from Examples 1-11, respectively, presented below.
Figure 6:
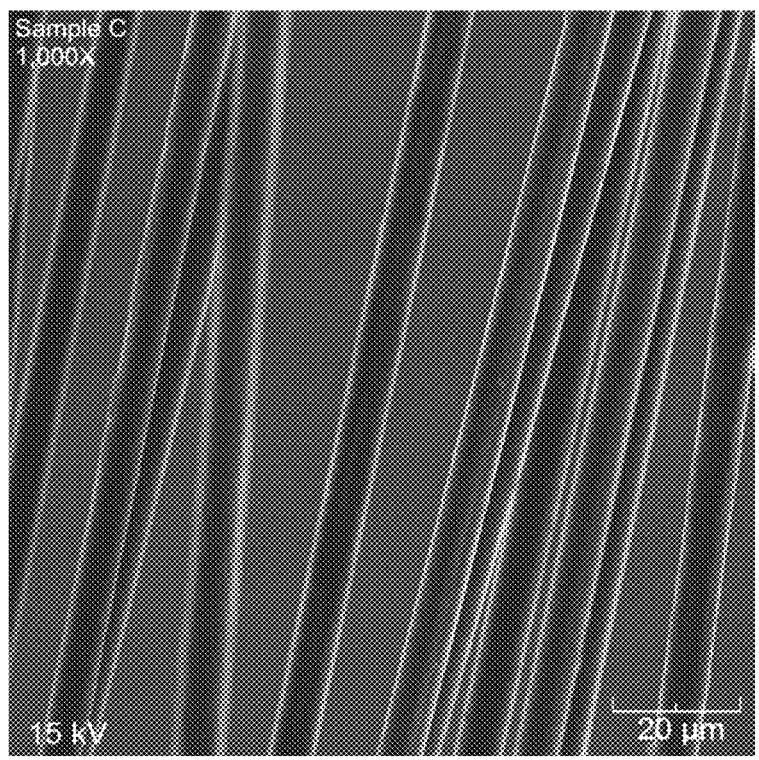
Figure 7:
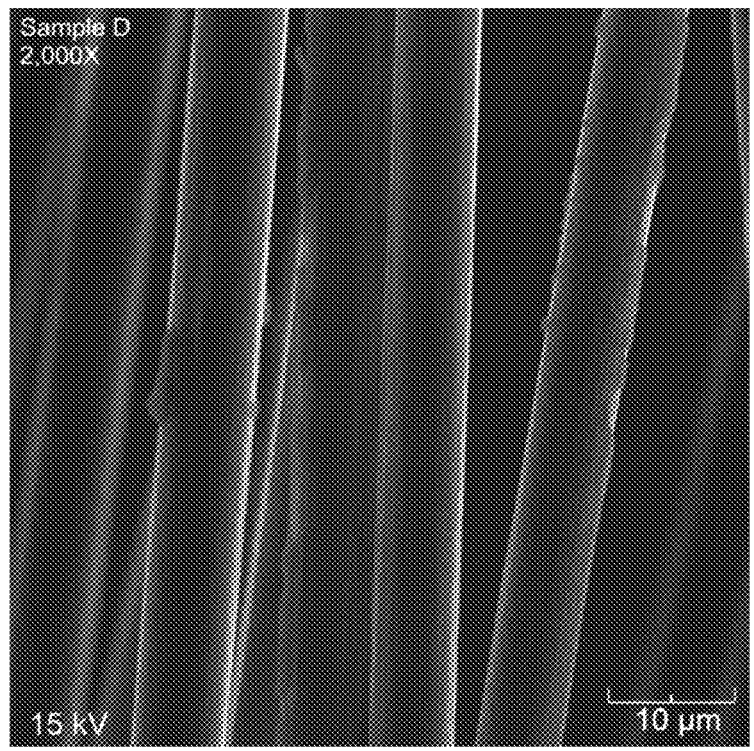
Figure 8:
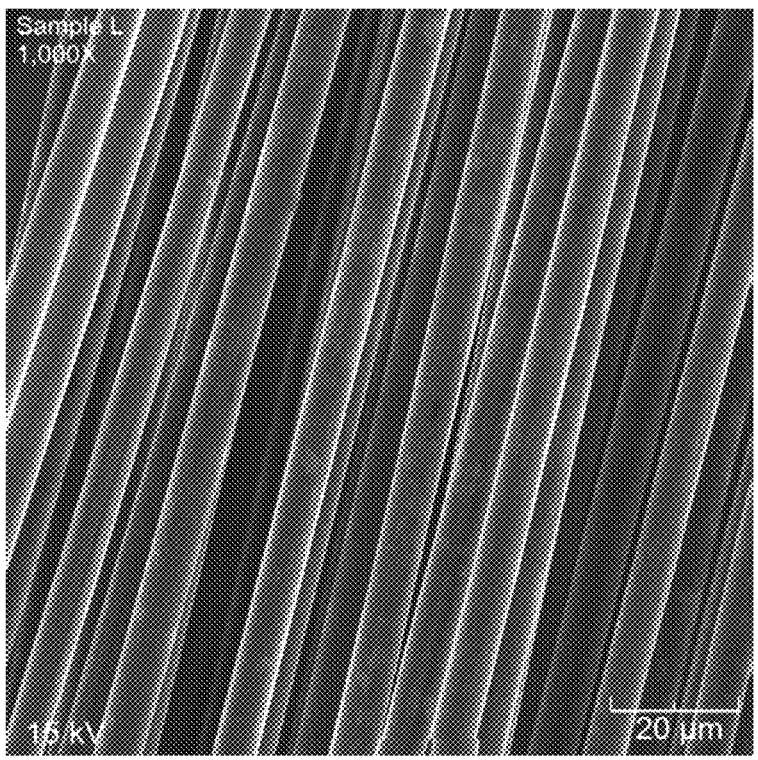
Figure 9:
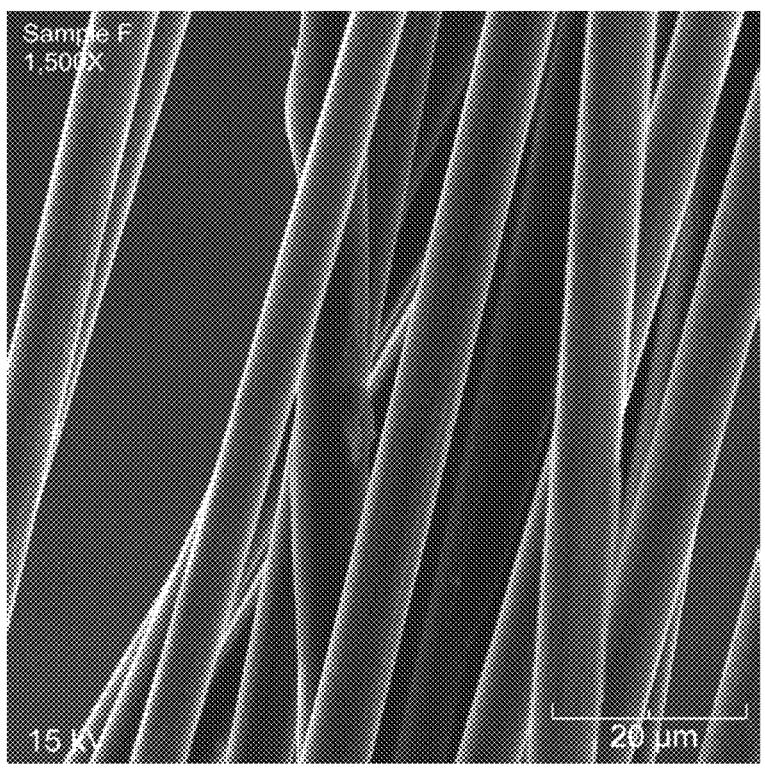
Figure 10:
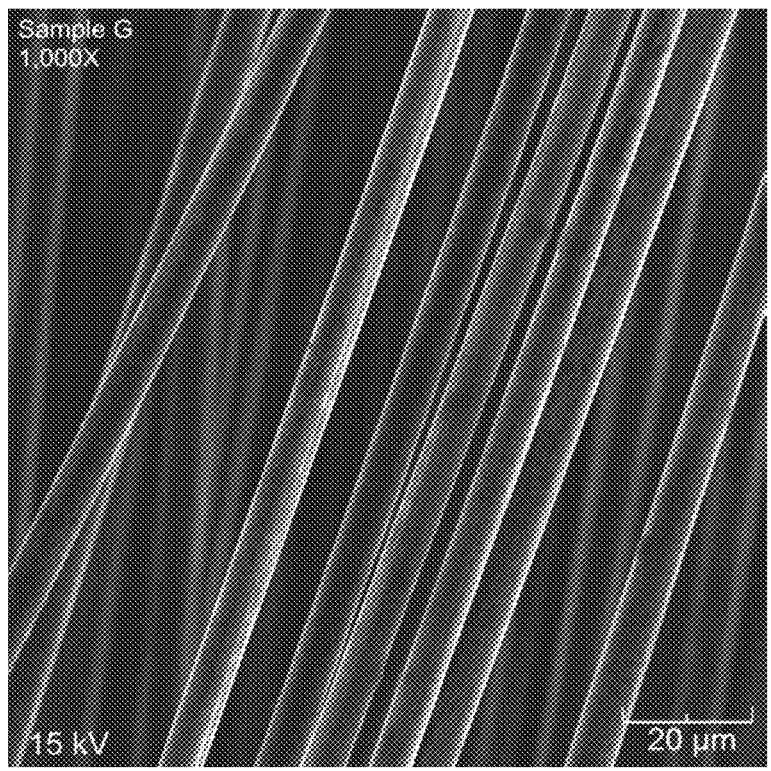
Figure 11:
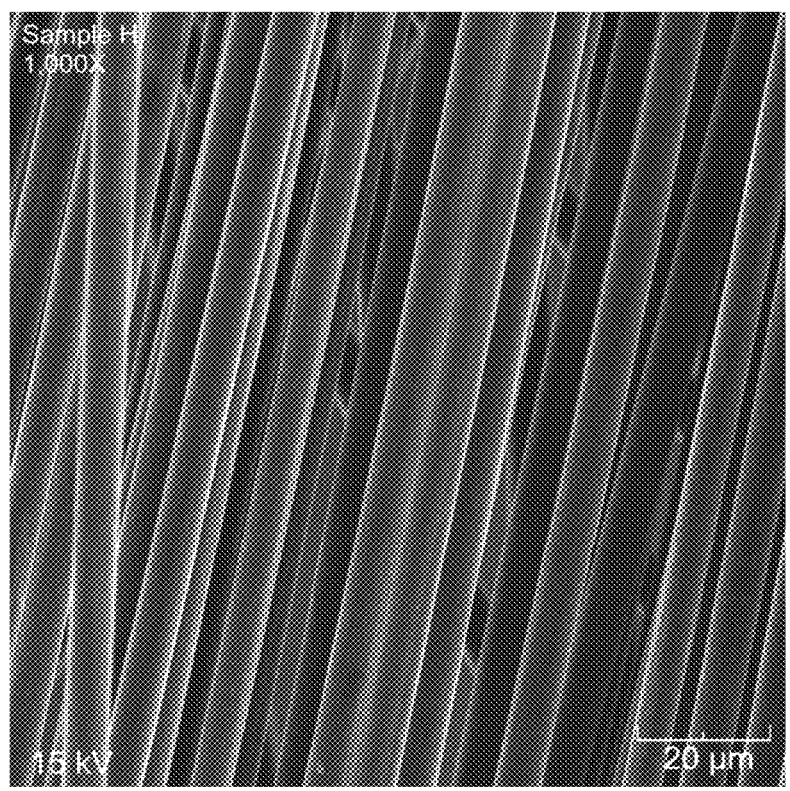

FIGS. 5-11 show scanning electron microscope (SEM) images of recovered carbon fibers from each of Examples 1-7, respectively. As seen in FIGS. 5 and 6, recovered carbon fibers from Examples 1 and 2 (which include a solvent wash but no carbon dioxide rinse) are mostly free of matrix material, although there appears to be some matrix material as well as sizing material that remains attached to the carbon fibers. As seen in FIG. 7, adding a liquid $CO_2$ rinse in Example 3 appears to help remove at least some additional matrix material relative to Examples 1 and 2. As seen in FIG. 8, substituting a supercritical $CO_2$ rinse in Example 4 for the liquid $CO_2$ rinse of Example 3 appears to remove some additional matrix material and/or sizing material relative to Example 3. Likewise as seen in FIG. 9, adding a rapid $CO_2$ sublimation step after the liquid $CO_2$ rinse in the processing of Example 5 appears to remove some additional matrix material and/or sizing material relative to Example 4. As seen in FIG. 10, performing two liquid $CO_2$ rinse steps followed by a rapid sublimation step in Example 6 appears to further clean carbon fibers of some additional matrix material and/or sizing material relative to Example 5. As seen in FIG. 11, performing an additional rapid sublimation step before a second liquid $CO_2$ rinse in Example 7 appears to further clean the carbon fibers of matrix material and/or sizing material relative to Example 6. The recovered carbon fibers shown in FIG. 11 appear to be cleaned of matrix material and sizing material to a very high degree.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate, disclaim or disavow any patentable subject matter. Furthermore, any feature described or claimed with respect to any disclosed variation may be combined in any combination with one or more of any other features of any other variation or variations, to the extent that the features are not necessarily technically compatible, and all such combinations are within the scope of the present invention. The description of a feature or features in a particular combination do not exclude the inclusion of an additional feature or features. Processing steps and sequencing are for illustration only, and such illustrations do not exclude inclusion of other steps or other sequencing of steps. Additional steps may be included between illustrated processing steps or before or after any illustrated processing step. Illustrated processing steps may include processing operations (e.g., sub-steps) in addition to particular processing operations illustrated or discussed with respect to the illustrated processing step.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term "at least a portion" means all or a portion that is less than all. The term "at least a part" means all or a part that is less than all. Pressures disclosed herein are absolute pressures, and not gauge pressures, unless otherwise indicated. Percentages in relation to composition of liquids and solids disclosed here in are weight percentages unless otherwise indicated and in relation to composition of gases disclosed herein are in volume percent unless otherwise indicated.

What is claimed is:

1. A method for processing a crude product containing reinforcing fibers recovered from a composite including the reinforcing fibers held in a matrix of a plastic material or a precursor for plastic material, wherein the crude product comprises some residual material of one or both of the matrix and fiber sizing on the reinforcing fibers, the method comprising:

with the crude product in the presence of the normally-gaseous substance, converting the normally-gaseous substance from a fluid form to a solid form in contact with the crude product, the first converting comprising reducing the temperature of the normally-gaseous substance; and after the first converting, second converting the normally-gaseous substance in the solid form from the solid form into a gaseous form, to assist dislodgment of at least a portion of the residual material from the reinforcing fibers.

2. The method according to claim 1, wherein the first converting comprises reducing temperature of the at least a portion of the normally-gaseous substance from a first temperature of at least 0° C. to the reduced temperature, wherein the reduced temperature is lower than −50° C.

3. The method according to claim 1, wherein the second converting comprises converting the normally-gaseous substance of the solid form from the solid form to the gaseous form in a time period of no greater than 60 seconds.

4. The method according to claim 1, wherein the second converting comprises contacting the crude product with a heat transfer fluid at a temperature that is at least 50° C. greater than a temperature of the solid form of the normally-gaseous substance.

5. The method according to claim 4, wherein the heat transfer fluid comprises a member selected from the group consisting of liquid water, liquid oil, air, steam and combinations thereof.

6. The method according to claim 1, wherein the normally-gaseous substance is carbon dioxide.

7. The method according to claim 1, wherein the normally-gaseous substance comprises a member selected from the group consisting of tetrachloroethylene, 1,1,1,2-tetrafluoroethane, difluoromethane, pentafluoroethane, and combinations thereof.

8. The method according to claim 1, wherein the second converting comprises rapid sublimation of the normally-gaseous substance.

9. The method according to claim 1, wherein the normally-gaseous substance is a solvent from prior processing of the composite to prepare the crude product.

10. The method according to claim 1, wherein the first converting comprises:
reducing pressure of the normally-gaseous substance from an elevated pressure; and
gas expansion cooling of the normally-gaseous substance during the reducing pressure.

11. The method according to claim 10, wherein the elevated pressure is at least 2 MPa.

12. The method according to claim 11, wherein the reducing pressure comprises reducing pressure of the normally-gaseous material from the elevated pressure to a lower pressure of 0.518 MPa or lower.

13. The method according to claim 3, wherein the second converting comprises contacting the crude product with a heat transfer fluid at a temperature that is at least 50° C. greater than a temperature of the solid form of the normally-gaseous substance.

14. The method according to claim 13, wherein the normally-gaseous substance is carbon dioxide.

15. The method according to claim 14, wherein the second converting comprises rapid sublimation of the normally-gaseous substance.

16. The method according to claim 15, wherein the first converting comprises:
reducing pressure of the normally-gaseous substance from an elevated pressure of at least 2 MPa to a lower pressure of 0.518 MPa or lower; and
gas expansion cooling of the normally-gaseous substance during the reducing pressure.

* * * * *